US012289232B2

(12) United States Patent
Ponnuru et al.

(10) Patent No.: US 12,289,232 B2
(45) Date of Patent: *Apr. 29, 2025

(54) SYSTEMS AND METHODS FOR ASYMMETRICAL PEER FORWARDING IN AN SD-WAN ENVIRONMENT

(71) Applicant: Cisco Technology, Inc., San Jose, CA (US)

(72) Inventors: Laxmikantha Reddy Ponnuru, San Ramon, CA (US); Arul Murugan Manickam, San Jose, CA (US); Michael David Tracy, Foster City, CA (US); Kannan Kumar, San Jose, CA (US); Hamzah Kardame, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/504,576

(22) Filed: Nov. 8, 2023

(65) Prior Publication Data

US 2024/0080267 A1 Mar. 7, 2024

Related U.S. Application Data

(63) Continuation of application No. 17/689,029, filed on Mar. 8, 2022, now Pat. No. 11,824,770.

(Continued)

(51) Int. Cl.
*H04L 45/00* (2022.01)
*H04L 45/028* (2022.01)
*H04L 45/44* (2022.01)

(52) U.S. Cl.
CPC ............ *H04L 45/38* (2013.01); *H04L 45/028* (2013.01); *H04L 45/44* (2013.01)

(58) Field of Classification Search
CPC .............................. H04L 45/38; H04L 45/028
(Continued)

(56) References Cited

U.S. PATENT DOCUMENTS

2014/0304354 A1* 10/2014 Chauhan ............ H04L 67/1095
709/213
2016/0261486 A1 9/2016 Fang et al.
(Continued)

FOREIGN PATENT DOCUMENTS

| CN | 101582904 A | 11/2009 | |
|---|---|---|---|
| EP | 3065353 A1 | 9/2016 | |
| WO | WO-2014052099 A2 * | 4/2014 | ........... H04L 47/125 |

OTHER PUBLICATIONS

Cisco: "AppNav Flow on IOS-XE", Retrieved from the Internet: URL: https://www.cisco.com/c/en/us/support/docs/routers/wide-area-application-service-s-waas-software/213852-appnav-flow-on-ios-xe.pdf, Oct. 31, 2018, 7 Pages.

(Continued)

*Primary Examiner* — Lan Dai T Truong
(74) *Attorney, Agent, or Firm* — Baker Botts L.L.P.

(57) ABSTRACT

In one embodiment, a method includes receiving, by a first node of a node cluster in a software-defined wide area network (SD-WAN), traffic from a wide area network (WAN), assigning, by the first node of the node cluster, flow ownership of the traffic to the first node, and communicating, by the first node of the node cluster, the traffic to a local area network (LAN). The method also includes receiving, by the first node of the node cluster, return traffic from a second node of the node cluster and detecting, by the first node of the node cluster, a diversion of the return traffic. The method further includes relinquishing, by the first node of the node cluster, the flow ownership and assigning, by the first node of the node cluster, the flow ownership to the second node of the node cluster.

20 Claims, 5 Drawing Sheets

Related U.S. Application Data (60) Provisional application No. 63/265,213, filed on Dec. 10, 2021.

(58) Field of Classification Search
USPC .......................................................... 709/238
See application file for complete search history.

(56) References Cited

U.S. PATENT DOCUMENTS

| | | |
|---|---|---|
| 2016/0337312 A1 | 11/2016 | Buchanan et al. |
| 2019/0312914 A1 | 10/2019 | Cohn |
| 2021/0112034 A1 | 4/2021 | Sundararajan et al. |
| 2021/0306261 A1 | 9/2021 | Duan et al. |

OTHER PUBLICATIONS

International Search Report and Written Opinion corresponding to PCT/US2022/080720, mailed Mar. 13, 2023, 17 pages.

\* cited by examiner

SYSTEMS AND METHODS FOR ASYMMETRICAL PEER FORWARDING IN AN SD-WAN ENVIRONMENT

CROSS-REFERENCE TO RELATED APPLICATIONS

This nonprovisional application is a continuation, under 35 U.S.C. § 120, of U.S. patent application Ser. No. 17/689,029 filed on Mar. 8, 2022 and entitled "SYSTEMS AND METHODS FOR ASYMMETRICAL PEER FORWARDING IN AN SD-WAN ENVIRONMENT", which claims benefit of U.S. Provisional Patent Application No. 63/265,213 filed Dec. 10, 2021 by Laxmikantha Reddy Ponnuru et al. and entitled "MINIMIZING ASYMMETRIC ROUTED PEER FORWARDING IN MULTI-NODE ALL-ACTIVE CLUSTER IN HIERARCHICAL SD-WAN," both of which are incorporated herein by reference as if reproduced in their entireties.

TECHNICAL FIELD

The present disclosure relates generally to communication networks, and more specifically to systems and methods for asymmetrical peer forwarding in a software-defined wide area network (SD-WAN) environment.

BACKGROUND

For scale-out data centers or hierarchical SD-WAN border routers in a colocation or point of presence (PoP) location, users may deploy multiple edge routers as an all-active cluster. In response to this deployment, multiple edge routers advertise prefixes for both local area network (LAN)-side traffic and wide area network (WAN)-side traffic, which may result in asymmetric routing. For example, flow from WAN-side traffic may egress to a first SD-WAN edge router, and flow from LAN-side traffic may egress to a second SD-WAN edge router. This asymmetric routed traffic may break stateful features such as firewall, network address translation (NAT), Network Based Application Recognition (NBAR), deep packet inspection (DPI), Snort, and the like.

DESCRIPTION OF EXAMPLE EMBODIMENTS

Overview

According to an embodiment, a first node of a node cluster in an SD-WAN environment includes one or more processors and one or more computer-readable non-transitory storage media coupled to the one or more processors and including instructions that, when executed by the one or more processors, cause the first node of the node cluster to perform operations. The operations include receiving traffic from a WAN, assigning flow ownership of the traffic to the first node of the node cluster, and communicating the traffic to a LAN. The operations also include receiving return traffic from a second node of the node cluster and detecting a diversion of the return traffic. The operations further include relinquishing the flow ownership and assigning the flow ownership to the second node of the node cluster.

In certain embodiments, the traffic and the return traffic are asymmetrically routed. In some embodiments, receiving the traffic from the WAN includes receiving the traffic from a core network, and the traffic and the return traffic are symmetrically routed through the core network.

In certain embodiments, assigning the flow ownership to the first node of the node cluster includes creating a flow owner entry in a flow entry table to identify the first node as a flow owner. In some embodiments, assigning the flow ownership to the second node of the node cluster includes updating the flow owner entry in the flow entry table to identify the second node as the flow owner.

In certain embodiments, detecting the diversion of the return traffic is in response to receiving the return traffic from the second node of the node cluster. In some embodiments, receiving the traffic from the WAN includes receiving the traffic from a border router of a core network. An egress node entry in a flow entry table for the border router may be updated in response to the first node assigning the flow ownership to the second node of the node cluster.

According to another embodiment, a method includes receiving, by a first node of a node cluster in an SD-WAN, traffic from a WAN, assigning, by the first node of the node cluster, flow ownership of the traffic to the first node, and communicating, by the first node of the node cluster, the traffic to a LAN. The method also includes receiving, by the first node of the node cluster, return traffic from a second node of the node cluster and detecting, by the first node of the node cluster, a diversion of the return traffic. The method further includes relinquishing, by the first node of the node cluster, the flow ownership and assigning, by the first node of the node cluster, the flow ownership to the second node of the node cluster.

According to yet another embodiment, one or more computer-readable non-transitory storage media embody instructions that, when executed by a processor, cause the processor to perform operations. The operations include receiving traffic from a WAN, assigning flow ownership of the traffic to the first node of the node cluster, and communicating the traffic to a LAN. The operations also include receiving return traffic from a second node of the node cluster and detecting a diversion of the return traffic. The operations further include relinquishing the flow ownership and assigning the flow ownership to the second node of the node cluster.

Technical advantages of certain embodiments of this disclosure may include one or more of the following. This disclosure describes systems and methods for minimizing asymmetrical peer forwarding in an SD-WAN environment, which may improve the data plane throughput, reduce latency, and/or improve application quality of experience. Certain embodiments of this disclosure allow for asymmetrical routing without breaking the stateful features such as firewall, NAT, NBAR, SNORT, and the like. Some embodiments of this disclosure reduce overhead and increase end-to-end performance of an SD-WAN and/or a hierarchical SD-WAN. Some embodiments of this disclosure use high-availability clusters to help ensure there is no single point of failure for critical Information Technology (IT) and/or to reduce or eliminate downtime.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

This disclosure describes systems and methods for asymmetrical peer forwarding in an SD-WAN environment. For the stateful features to work properly in asymmetric routing environments in an all-active cluster mode, one typical solution is for the first node that received the flow to create a flow entry. The first node becomes the flow owner and syncs the flow state to all peer nodes in the cluster. If any of the peer nodes receive the asymmetric routed traffic of the given flow, then the peer node will divert and peer-forward the traffic to the owner node. As such, any given flow is processed on only one node in the cluster, and all stateful features may work seamlessly. Even in the case of the active/standby model, the asymmetric routed traffic may be peer-forwarded from standby to active.

For LAN-side traffic, there is no control in the LAN network to force the reverse flow path toward a particular node. Since the LAN router may equal-cost multi-path (ECMP) the traffic to any WAN edge node in the cluster, the asymmetrically routed reverse flow traffic may be peer-forwarded to the flow owner node. Certain embodiments of this disclosure change flow ownership to reduce peer forwarding on the LAN side.

Figure 1:
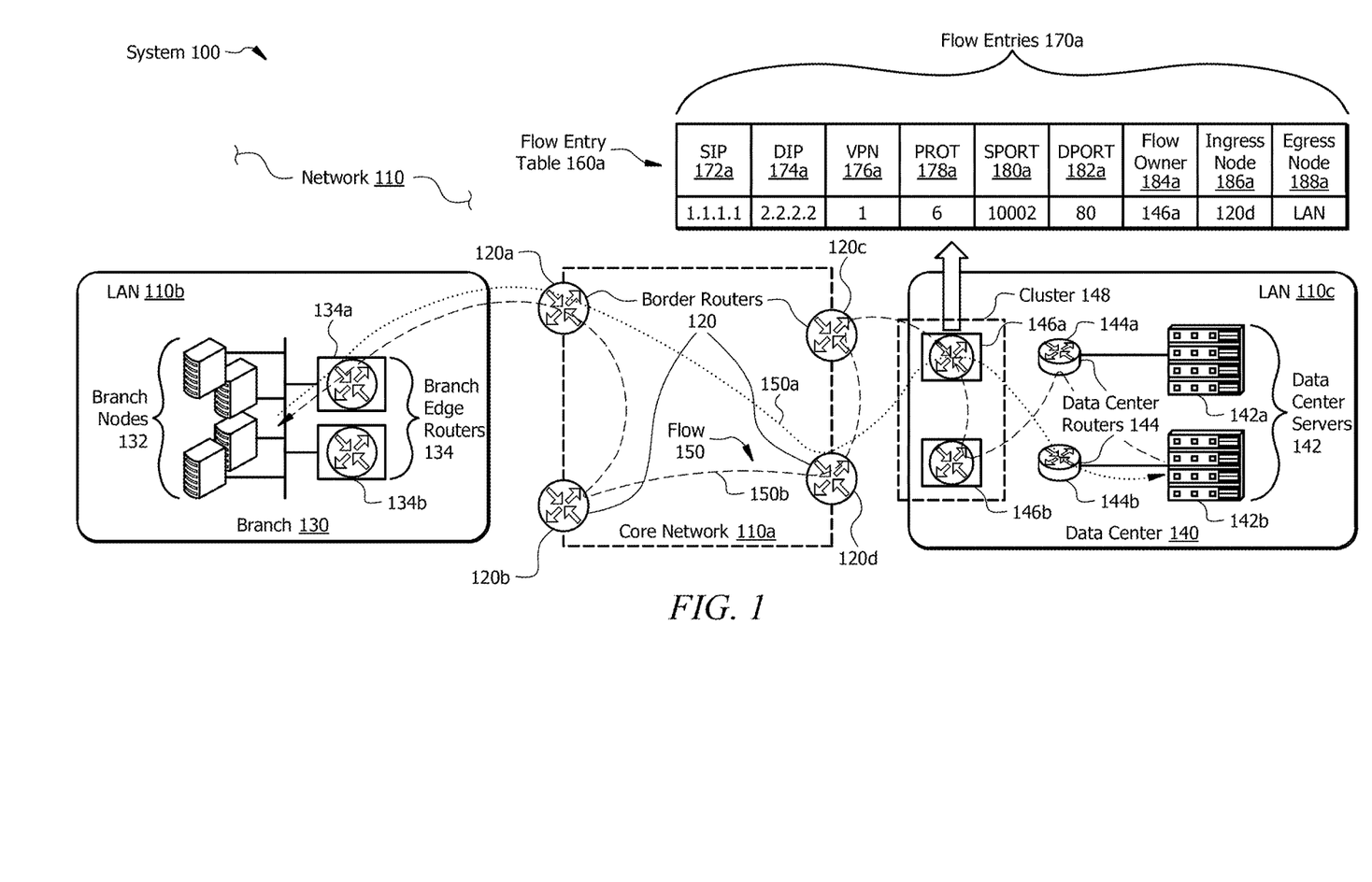
FIG. 1 illustrates an example system for asymmetrical peer forwarding in an SD-WAN environment.

FIG. 1 illustrates an example system 100 for asymmetrical peer forwarding in an SD-WAN environment. System 100 or portions thereof may be associated with an entity, which may include any entity, such as a business, company, or enterprise, that uses peer forwarding techniques. In certain embodiments, the entity may be a service provider that provides peer forwarding services. The components of system 100 may include any suitable combination of hardware, firmware, and software. For example, the components of system 100 may use one or more elements of the computer system of FIG. 3. In the illustrated embodiment of FIG. 1, system 100 includes a network 110, border routers 120, a branch 130, branch nodes 132, branch edge routers 134, a data center 140, data center servers 142, data center routers 144, customer edge routers 146, a cluster 148, flow entry tables 160, and flow entries 170.

Network 110 of system 100 is any type of network that facilitates communication between components of system 100. Network 110 may connect one or more components of system 100. One or more portions of network 110 may include an ad-hoc network, the Internet, an intranet, an extranet, a virtual private network (VPN), an Ethernet VPN (EVPN), a LAN, a wireless LAN (WLAN), a virtual LAN (VLAN), a WAN, a wireless WAN (WWAN), an SD-WAN, a metropolitan area network (MAN), a portion of the Public Switched Telephone Network (PSTN), a cellular telephone network, a Digital Subscriber Line (DSL), an Multiprotocol Label Switching (MPLS) network, a 3G/4G/5G network, a Long Term Evolution (LTE) network, a cloud network, a combination of two or more of these, or other suitable types of networks. Network 110 may include one or more different types of networks.

Network 110 may be any communications network, such as a private network, a public network, a connection through the Internet, a mobile network, a WI-FI network, etc. Network 110 may include a core network, an access network of a service provider, an Internet service provider (ISP) network, and the like. An access network is the part of the network that provides a user access to a service. A core network is the part of network 110 that acts like a backbone to connect the different parts of the access network(s). One or more components of system 100 may communicate over network 110. In the illustrated embodiment of FIG. 1, network 110 is an SD-WAN. Network 110 of FIG. 1 includes a core network 110a (e.g., a hierarchical SD-WAN core network), a LAN 110b and a LAN 110c. LAN 110b and LAN 110c are each a collection of devices connected together in one physical location (e.g., a building, an office, a home, etc.). A LAN can be small or large, ranging from a home network with one user to an enterprise network with thousands of users and devices in an office or school.

Network 110 of system 100 may include one or more nodes. Nodes are connection points within network 110 that receive, create, store and/or send data along a path. Nodes may include one or more redistribution points that recognize, process, and forward data to other nodes of network 110. Nodes may include virtual and/or physical nodes. For example, nodes may include one or more virtual machines, bare metal servers, and the like. As another example, nodes may include data communications equipment such as computers, routers, servers, printers, workstations, switches, bridges, modems, hubs, and the like. The nodes of network 110 may include one or more border routers 120, branch nodes 132, branch edge routers 134, data center servers 142, data center routers 144, customer edge routers 146, and the like.

Border routers 120 of system 100 are specialized routers that reside at a boundary of two or more different types of networks 110. In certain embodiments, border routers 120 use static and/or dynamic routing to send data to and/or receive data from different networks 110 of system 100. Border routers 120 may include one or more hardware devices, one or more servers that include routing software, and the like. In certain embodiments, border routers 120 are provider edge routers. A provider edge router is a router between one network service provider's area and areas administered by other network providers. Border routers 120 may include equipment capable of a broad range of routing protocols such as Border Gateway Protocol (BGP), Open Shortest Path First (OSPF), Multiprotocol Label Switching (MPLS), and the like. In the illustrated embodiment of FIG. 1, border routers 120 include border router 120a, border router 120b, border router 120c, and border router 120d. Border router 120a and border router 120b reside at the boundary of core network 110a and LAN 110b. Border router 120c and border router 120d reside at the boundary of core network 110a and LAN 110c.

Branch 130 of system 100 is a part of an enterprise network infrastructure that provides users at a geographically disperse remote site access to the same network services as users in the enterprise campus. Branch 130 may include one or more buildings, offices, stores, homes, and the like. In certain embodiments, branch 130 and data center 140 are established and maintained by the same business enterprise. In the illustrated embodiment of FIG. 1, branch 130 includes branch nodes 132 and branch edge routers 134. Branch nodes 132 of branch 130 are computers, computer programs, and/or devices that provide resources, data services, and/or programs to clients. Branch nodes 132 may provide the processing, memory, local storage, and network connectivity that drive applications. In the illustrated embodiment of FIG. 1, branch nodes 132 communicate data to branch edge routers 134 via LAN 110b.

Branch edge routers 134 of branch 130 are specialized routers that reside at an edge of LAN 110b. In certain embodiments, branch edge routers 134 use static and/or dynamic routing to send data to and/or receive data from one or more networks 110 of system 100. Branch edge routers 134 may include one or more hardware devices, one or more servers that include routing software, and the like. In the illustrated embodiment of FIG. 1, branch edge routers 134 include branch edge router 134a and branch edge router 134b. Branch edge router 134a and branch edge router 134b of LAN 110b may communicate traffic to and/or receive traffic from border router 120a and border router 120b of core network 110a.

Data center 140 of system 100 is a physical facility that organizations use to house their critical applications and data. Data center 140 may include routers, switches, firewalls, storage systems, servers, application-delivery controllers, and the like. These components of data center 140 may store and/or manage business-critical data, applications, and the like. Data center 140 may be an enterprise data center, a managed services data center, a colocation data center, a cloud data center, a combination thereof, or any other suitable type of data center. In the illustrated embodiment of FIG. 1, data center 140 includes data center servers 142, data center routers 144, and customer edge routers 146.

Data center servers 142 of data center 140 are computers, computer programs, and/or devices that provide resources, data services, and/or programs to data center 140. Data center servers 142 may provide the processing, memory, local storage, and network connectivity that drive applications. Data center servers 142 may include physical servers and/or virtualized servers. In the illustrated embodiment of FIG. 1, data center servers 142 communicate traffic to and/or receive traffic from data center routers 144 of data center 140.

Data center routers 144 of data center 140 are computers, computer programs, and/or devices that use static and/or dynamic routing to send data to and/or receive data from one or more other components of data center 140. Data center routers 144 may include one or more hardware devices, one or more servers that include routing software, and the like. In the illustrated embodiment of FIG. 1, data center routers 144 include data center router 144a and data center router 144b. Data center router 144a and data center router 144b of data center 140 may communicate traffic to and/or receive traffic from servers 142 and customer edge routers 146 of data center 140.

Customer edge routers 146 of data center 140 act as gateways at the edge of LAN 110c. In certain embodiments, customer edge routers 146 provide an Ethernet interface between the customer's LAN 110c and the provider's core network 110a. In certain embodiments, customer edge routers 146 are located at the premises of a customer and are connected to the provider edge router of a service provider's network (e.g., an IP/MPLS network). In certain embodiments, customer edge routers 146 of data center 140 peer with border routers 120 of core network 110a. In some embodiments, customer edge routers 146 may use a static routing protocol (e.g., an interior gateway protocol such as OSPF) and/or dynamic routing protocol (e.g., an exterior gateway protocol such as BGP). Customer edge routers 146 may be owned by the customer or the service provider. In the illustrated embodiment of FIG. 1, customer edge routers 146 include customer edge router 146a and customer edge router 146b. Customer edge router 146a and customer edge router 146b of FIG. 1 are part of the same cluster 148.

Cluster 148 of data center 140 is a group of customer edge routers 146 that operate as a single, unified system. In certain embodiments, cluster 148 is a high-availability cluster. Customer edge routers 146 of cluster 148 may share the same storage but use different networks. In some embodiments, if a node (e.g., customer edge router 146a) in cluster 148 fails, another node (e.g., customer edge router 146b) can take over immediately to help ensure the application or service supported by cluster 148 remains operational. Cluster 148 of system 100 may be an active/active cluster or an active/passive cluster. In an active/active cluster, all nodes of cluster 148 are active (e.g., all nodes of cluster 148 run the same kind of service simultaneously). In an active/passive cluster, at least one node of cluster 148 is active (e.g., operational) and at least one node of cluster 148 is passive (e.g., on standby).

In certain embodiments, customer edge routers 146 of cluster 148 are interconnected by a control interface and/or a data interface. The control interface is used to send and receive the control state between customer edge routers 146. The data interface is used to send divert traffic from a non-flow owner node of cluster 148 to a flow owner node of cluster 148. When a flow owner (e.g., customer edge router 146a) receives flow 150 on cluster data interface from a peer node (e.g., customer edge router 146b), the flow owner will detect that flow 150 is being diverted from the peer node.

FIG. 1 illustrates an asymmetric flow 150 of traffic. Asymmetric flow 150 includes flow 150a of traffic in a first direction from branch nodes 132 of branch 130 to data center servers 142 of data center 140, and flow 150b of return traffic in a second direction from data center servers 142 of data center 140 back to branch nodes 132 of branch 130. Traffic may include Transmission Control Protocol (TCP) traffic, User Datagram Protocol (UDP) traffic, Internet Control Message Protocol (ICMP) traffic, and the like. Traffic associated with flow 150a begins at branch nodes 132 of branch 130, flows through branch edge router 134a of branch 130, flows through border router 120a of core network 110a, flows through border router 120d of core network 110a, flows through customer edge router 146a of data center 140, flows through data center router 144b of data center 140, and arrives at server 142b of data center 140.

Traffic associated with flow 150b, the return traffic, flows from data center server 142b of data center 140 to data center router 144a of data center 140, flows through customer edge router 146b of data center 140, flows through customer edge router 146a (via peer forwarding) of data center 140, flows through border router 120c of core network 110a, flows through border router 120d of core network 110a (via peer forwarding), flows through border router 120b of core network 110a, flows through border router 120a of core network 110a (via peer forwarding), flows through branch edge router 134a of branch 130, and arrives at nodes 132 of branch 130.

Flow entry tables 160 of system 100 are tables used to instruct packets of flow 150. Flow entry tables 160 include flow entries 170. Flow entries 170 are used to match and process packets. Flow entries 170 include a source IP address (SIP) entry 172, a destination IP address (DIP) entry 174, a VPN entry 176, a protocol (PROTO) entry 178, a source port (SPORT) entry 180, a destination port (DPORT) entry 182, a flow owner entry 184, an ingress node entry 186, and an egress node entry 188. Source IP address entry 172 is used to indicate the source IP address of the traffic of flow 150. Destination IP address entry 172 is used to indicate the destination IP address of the traffic of flow 150. VPN entry 176 is used to indicate the VPN number associated with flow 150. Protocol entry 178 is used to indicate the protocol (e.g., TCP (number 6), UDP, ICMP, etc.) associated with flow 150. Source port entry 180 indicates the source port associated with the traffic of flow 150. Destination port entry 182 indicates the destination port associated with the traffic of flow 150. Flow owner entry 184 indicates the flow owner of flow 150. Ingress node entry 186 indicates the node from which the traffic of flow 150 was received. Egress node entry 188 indicates the node from which the traffic of flow 150 is directed to (e.g., the next hop node).

In some embodiments, each customer edge router 146 of node cluster 148 includes its own flow entry table 160. In the illustrated embodiment of FIG. 1, customer edge router 146*a* includes flow entry table 160*a*. Upon receiving flow 150*a* from border router 120*d*, customer edge router 146*a* of data center 140 may create flow owner entry 184*a* of flow entry table 160*a* and become the flow owner for flow 150. Customer edge router 146*a* syncs flow owner entry 184*a* to customer edge router 146*b* in cluster 148. Customer edge router 146*b* installs its own flow entry table for flow 150, marking customer edge router 146*a* as the flow owner. However, as indicated in FIG. 1, return flow 150*b* from server 142*b* of data center 140 may be asymmetrically routed to customer edge router 146*b*. This asymmetrically routed traffic, looking at the flow owner entry (which indicates customer edge router 146*a* as the flow owner) at the beginning of the ingress processing, is diverted and peer forwarded to customer edge router 146*a*. In certain embodiments, the diverted packet carries metadata with VPN and other required context. On customer edge router 146*a*, the packet context is restored and processed as if it is ingress from data center router 144*a*. Customer edge router 146*a* then forwards the packet to border router 120*c*.

In the illustrated embodiment of FIG. 1, all the stateful features for flow 150 will run on customer edge router 146*a*. However, the peer-forwarding from customer edge router 146*b* to customer edge router 146*a* results in extra overhead. The same issue is presented with the active/active and active/standby cluster models. Asymmetric routing is expected in active/active and active/standby clusters 148, and this asymmetric routing may break stateful features such as firewall, DPI, SNORT, and the like. Asymmetrically routed traffic is diverted or peer-forwarded to the flow owner or active node so the stateful features can process the bi-directional traffic. However, this divert may result in extra overhead, may increase latency, and may reduce the end-to-end performance. Example embodiments of this disclosure minimize the traffic divert or peer-forwarding between nodes in a high-availability (HA) cluster.

Figure 2:
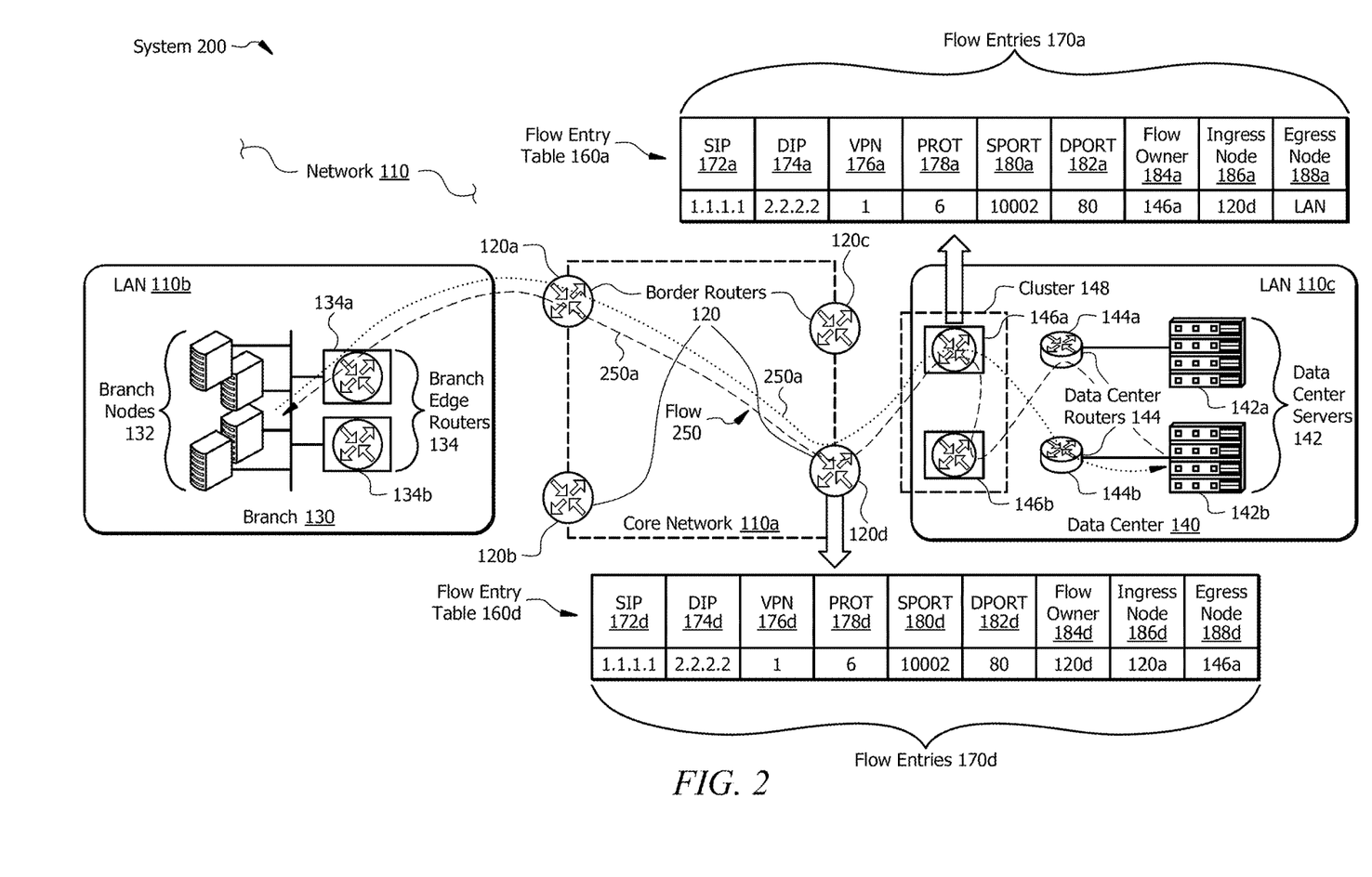
FIG. 2 illustrates an example system for minimizing asymmetrical peer forwarding in a hierarchical SD-WAN environment.

FIG. 2 illustrates an example system 200 for minimizing asymmetrical peer forwarding in a hierarchical SD-WAN environment. System 200 includes network 110, border routers 120, branch 130, branch nodes 132, branch edge routers 134, data center 140, data center servers 142, data center routers 144, customer edge routers 146, cluster 148, flow entry tables 160, and flow entries 170, which are described above in reference to FIG. 1.

FIG. 2 illustrates an asymmetric flow 250 of traffic. Asymmetric flow 250 includes flow 250*a* of traffic in a first direction from branch nodes 132 of branch 130 to data center servers 142 of data center 140, and flow 250*b* of return traffic in a second direction from data center servers 142 of data center 140 back to branch nodes 132 of branch 130. Traffic may include TCP traffic, UDP traffic, ICMP traffic, and the like. Traffic associated with flow 250*a* begins at branch nodes 132 of branch 130, flows through branch edge router 134*a* of branch 130, flows through border router 120*a* of core network 110*a*, flows through border router 120*d* of core network 110*a*, flows through customer edge router 146*a* of data center 140, flows through data center router 144*b* of data center 140, and arrives at server 142*b* of data center 140.

Traffic associated with flow 250*b*, the return traffic, flows from data center server 142*b* to data center router 144*a* of data center 140, flows through customer edge router 146*a* of data center 140, flows through customer edge router 146*b* of data center 140, flows through customer edge router 146*a* (via peer forwarding) of data center 140, flows through border router 120*d* of core network 110*a*, flows through border router 120*a* of core network 110*a*, flows through branch edge router 134*a* of branch 130, and arrives at nodes 132 of branch 130.

In the illustrated embodiment of FIG. 2, the peer-forwarding within core network 110*a* uses a per-flow cache of the origin SD-WAN system to force the routing to choose the path back to the same origin SD-WAN system if the path is available. As such, flow 250 of system 200 is symmetrical through core network 110*a*. Border router 120*d* of system 200 includes flow entry table 160*d*. Flow entry table 160*d* includes flow entries 170*d*. Flow entries 170*d* cache the origin/ingress node. The default routing decision for flow 250*b* is forced at customer edge router 146*a* to send flow 150*b* back to border router 120*d*. Similarly, border router 120*d* also forces the routing to send flow 150*b* to border router 120*a* instead of border router 120*b*. This helps peer-forwarding reduction at SD-WAN core network 110*a*. However, for the from—LAN traffic, there is no control in LAN 110*c* to force reverse flow 150*b* one way or the other because data center router 144*a* will ECMP route the traffic to any customer edge router 146 in cluster 148. Since customer edge router 146*a* is the flow owner, the asymmetrically routed reverse flow traffic is peer-forwarded from customer edge router 146*b* to customer edge router 146*a*. With all the nodes active in cluster 148, the LAN-side traffic is diverted to customer edge router 146*a* (the flow owner) in the example embodiment of system 200.

Figure 3:
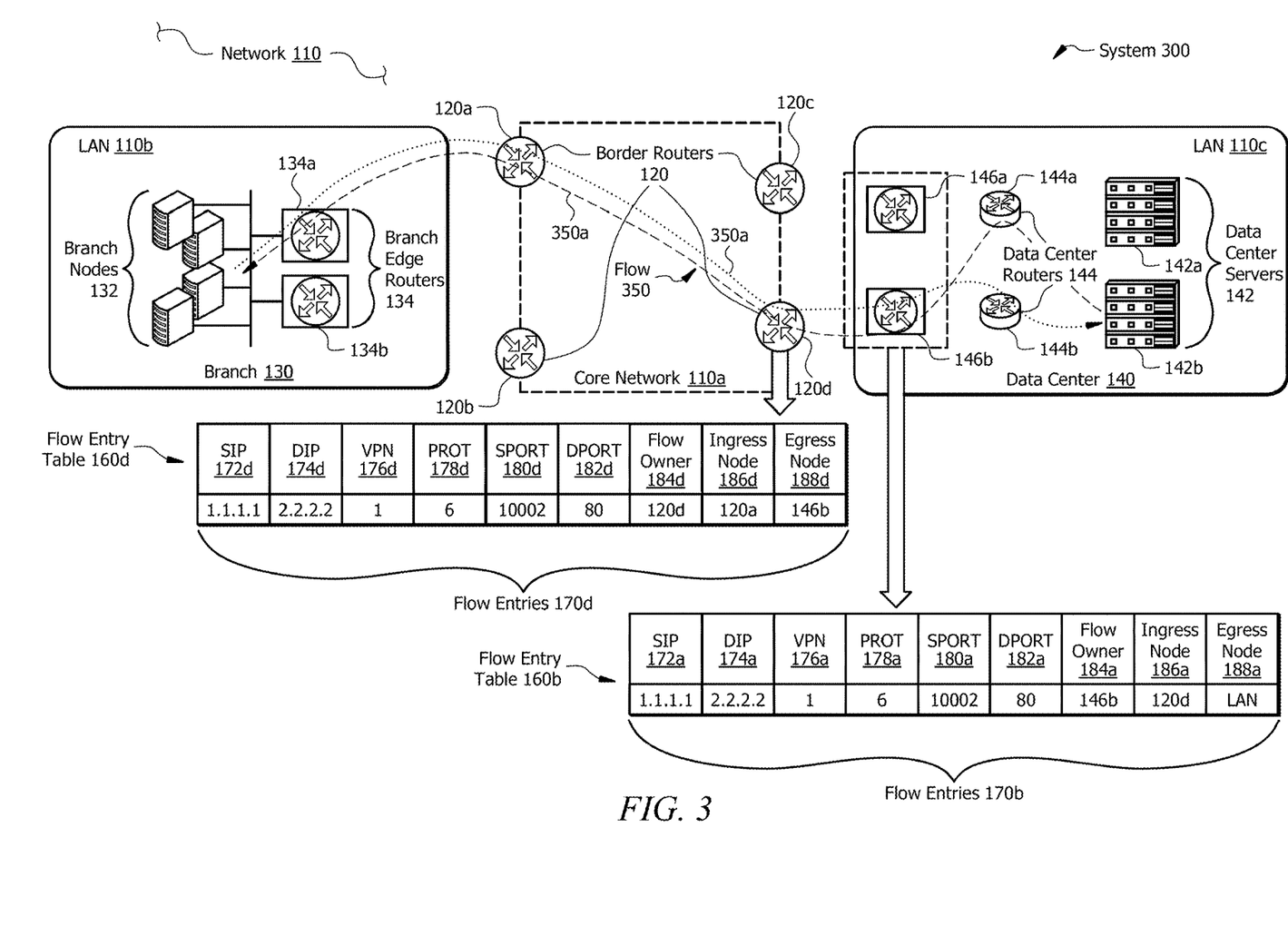
FIG. 3 illustrates an example system for reducing asymmetrical traffic diversion to the flow owner in an SD-WAN environment.

FIG. 3 illustrates an example system 300 for reducing asymmetrical traffic diversion to the flow owner in an SD-WAN environment. System 300 includes network 110, border routers 120, branch 130, branch nodes 132, branch edge routers 134, data center 140, data center servers 142, data center routers 144, customer edge routers 146, cluster 148, flow entry tables 160, and flow entries 170, which are described above in reference to FIG. 1.

FIG. 3 illustrates an asymmetric flow 350 of traffic. Asymmetric flow 350 includes flow 350*a* of traffic in a first direction from branch nodes 132 of branch 130 to data center servers 142 of data center 140, and flow 350*b* of return traffic in a second direction from data center servers 142 of data center 140 back to branch nodes 132 of branch 130. Traffic may include TCP traffic, UDP traffic, ICMP traffic, and the like. Traffic associated with flow 350*a* begins at branch nodes 132 of branch 130, flows through branch edge router 134*a* of branch 130, flows through border router 120*a* of core network 110*a*, flows through border router 120*d* of core network 110*a*, flows through customer edge router 146*b* of data center 140, flows through data center router 144*b* of data center 140, and arrives at server 142*b* of data center 140. Traffic associated with flow 350*b*, the return traffic, flows from data center server 142*b* to data center router 144*a* of data center 140, flows through customer edge router 146*b* of data center 140, flows through border router 120*d* of core network 110*a*, flows through border router 120*a* of core network 110a, flows through branch edge router 134a of branch 130, and arrives at nodes 132 of branch 130.

In the illustrated embodiment of FIG. 3, customer edge router 146a is the flow owner of cluster 148. Customer edge router 146a detects that the return traffic is being diverted to customer edge router 146b. For example, referring to system 200 of FIG. 2, customer edge router 146a may detect that flow 150b is being diverted from customer edge router 146b. In response to this detection, customer edge router 146a relinquishes flow ownership and makes customer edge router 146b (e.g., the node that is diverting the asymmetrically routed traffic) the new flow owner. Flow owner entry 184b of flow entry table 160b for customer edge router 146b is updated to reflect that customer edge router 146b is the new owner of flow 150. Egress node entry 188b of flow entry table 160d for border router 120d is changed from customer edge router 146a to customer edge router 146b to reflect the new flow ownership.

In response to border router 120d of core network 110a identifying customer edge router 146b as the new flow owner of flow 150, border router 120d sends traffic from flow 150a to customer edge router 146b. The return traffic from LAN 110c was already received at customer edge router 146b, thereby achieving end-to-end flow symmetry for core network 110a. As such, no asymmetrical routing divert is required. Traffic from core network 110a automatically switches to the new flow owner, where the LAN-side return traffic is also received. Bi-directional traffic (both from WAN and from LAN) is forwarded via a single node in the cluster 148. This embodiment of FIG. 3 helps to reduce peer-forwarding (and/or asymmetrical routing divert) in both active/active and active/standby modes and improves efficiencies. This embodiment may be implemented in both an SD-WAN environment and in a hierarchical SD-WAN cluster.

Although FIGS. 1 through 3 illustrate a particular number of networks 110, border routers 120, branches 130, branch nodes 132, branch edge routers 134, data centers 140, data center servers 142, data center routers 144, customer edge routers 146, clusters 148, flow entry tables 160, and flow entries 170, this disclosure contemplates any suitable number of networks 110, border routers 120, branches 130, branch nodes 132, branch edge routers 134, data centers 140, data center servers 142, data center routers 144, customer edge routers 146, clusters 148, flow entry tables 160, and flow entries 170. For example, cluster 148 may include more than two customer edge routers 146.

Although FIGS. 1 through 3 illustrate a particular arrangement of network 110, border routers 120, branch 130, branch nodes 132, branch edge routers 134, data center 140, data center servers 142, data center routers 144, customer edge routers 146, cluster 148, flow entry tables 160, and flow entries 170, this disclosure contemplates any suitable arrangement of network 110, border routers 120, branch 130, branch nodes 132, branch edge routers 134, data center 140, data center servers 142, data center routers 144, customer edge routers 146, cluster 148, flow entry tables 160, and flow entries 170. Furthermore, although FIG. 1 describes and illustrates particular components, devices, or systems carrying out particular actions, this disclosure contemplates any suitable combination of any suitable components, devices, or systems carrying out any suitable actions.

Figure 4:
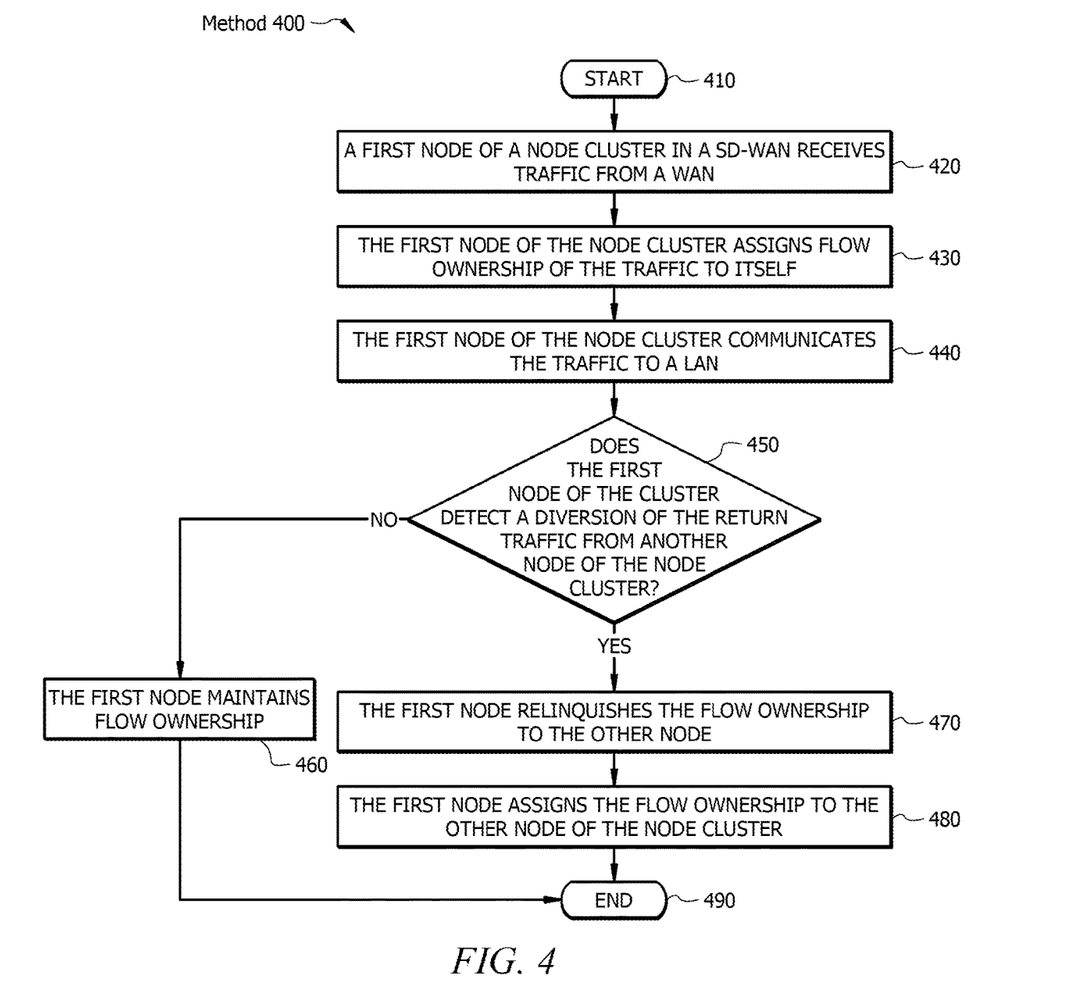
FIG. 4 illustrates an example method for reducing asymmetrical traffic diversion to the flow owner in an SD-WAN environment.

FIG. 4 illustrates an example method 400 for reducing asymmetrical traffic diversion to the flow owner in an SD-WAN environment. Method 400 of FIG. 4 may be used by system 100 of FIG. 1, system 200 of FIG. 2, and/or system 300 of FIG. 3. Method 400 starts at step 410. At step 420 of method 400, a first node of a node cluster in an SD-WAN receives traffic from a WAN. For example, referring to system 200 of FIG. 2, customer edge router 146a of LAN 110c may receive flow 250b of traffic from border router 120d of core network 110a.

Method 400 then moves from step 420 to step 430, where the first node of the node cluster assign flow ownership of the traffic to itself. For example, referring to system 200 of FIG. 2, customer edge router 146a of LAN 110c may create or update flow owner entry 184a of flow entry table 160a to indicate that customer edge router 146a is the flow owner of flow 250. Method 400 then moves from step 430 to step 440, where the first node of the node cluster communicates the traffic to a LAN. For example, referring to system 200 of FIG. 2, customer edge router 146 may communicate traffic from flow 150a to data center router 144b, which in turn sends the traffic to data center server 142b of data center 140. Method 400 then moves from step 440 to step 450.

At step 450 of method 400, the first node of the cluster determines whether it has detected a diversion of the return traffic from another node of the node cluster. For example, referring to system 200 of FIG. 2, customer edge router 146a may receive return flow 250b of traffic on a cluster data interface from customer edge router 146b. If the first node does not receive the return traffic from another node of the node cluster, method 400 moves from step 450 to 460, where the first node maintains flow ownership of the traffic.

If, at step 450, the first node of the cluster detects a diversion of the return traffic from another node of the node cluster, method 400 advances from step 450 to step 470, where the first node relinquishes flow ownership to the other node. For example, referring to system 300 of FIG. 3, upon customer edge router 146a detecting that it has received diverted traffic from customer edge router 146b, customer edge router 146a relinquishes flow ownership to customer edge router 146b. Method 400 then moves from step 470 to step 480, where the first node assigns the flow ownership to the other node of the node cluster. For example, referring to system 300 of FIG. 3, customer edge router 146a may update flow owner entry 184a in flow entry table 160a to identify customer edge router 146b as the flow owner. Method 400 then moves from steps 460 and 480 to step 490, where method 400 ends.

Although this disclosure describes and illustrates particular steps of method 400 of FIG. 4 as occurring in a particular order, this disclosure contemplates any suitable steps of method 400 of FIG. 4 occurring in any suitable order. Although this disclosure describes and illustrates an example flow diagram for reducing asymmetrical traffic diversion including the particular steps of method 400 of FIG. 4, this disclosure contemplates any suitable flow diagram for reducing traffic diversion including any suitable steps, which may include all, some, or none of the steps of method 400 of FIG. 4, where appropriate. Although FIG. 4 describes and illustrates particular components, devices, or systems carrying out particular actions, this disclosure contemplates any suitable combination of any suitable components, devices, or systems carrying out any suitable actions.

Figure 5:
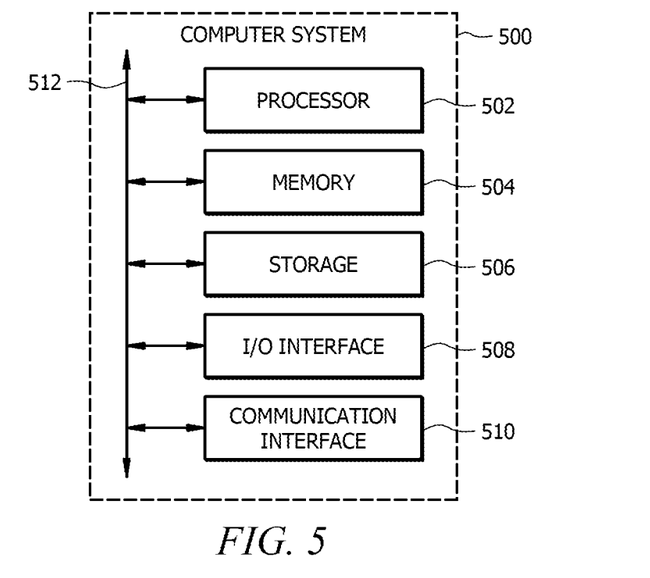
FIG. 5 illustrates an example computer system that may be used by the systems and methods described herein.

FIG. 5 illustrates an example computer system 500. In particular embodiments, one or more computer system 500 perform one or more steps of one or more methods described or illustrated herein. In particular embodiments, one or more computer system 300 provide functionality described or illustrated herein. In particular embodiments, software running on one or more computer system 500 performs one or more steps of one or more methods described or illustrated herein or provides functionality described or illustrated herein. Particular embodiments include one or more portions of one or more computer system 300. Herein, reference to a computer system may encompass a computing device, and vice versa, where appropriate. Moreover, reference to a computer system may encompass one or more computer systems, where appropriate.

This disclosure contemplates any suitable number of computer system 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer system 500; be unitary or distributed; span multiple locations; span multiple machines; span multiple data centers; or reside in a cloud, which may include one or more cloud components in one or more networks. Where appropriate, one or more computer system 500 may perform without substantial spatial or temporal limitation one or more steps of one or more methods described or illustrated herein. As an example and not by way of limitation, one or more computer system 500 may perform in real time or in batch mode one or more steps of one or more methods described or illustrated herein. One or more computer system 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 404, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or USB drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 508 may include one or more device or software drivers enabling processor 502 to drive one or more of these I/O devices. I/O interface 508 may include one or more I/O interfaces 408, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer system 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A network component comprising one or more processors and one or more computer-readable non-transitory storage media coupled to the one or more processors and including instructions that, when executed by the one or more processors, cause the network component to perform operations comprising:
   receiving traffic from a first network;
   assigning flow ownership of the traffic to a first node;

communicating the traffic to a second network;
receiving return traffic from a second node;
detecting a diversion of the return traffic;
relinquishing the flow ownership; and
assigning the flow ownership to the second node.

2. The network component of claim 1, wherein:
a node cluster comprises the first node and the second node; and
the network component is the first node of the node cluster.

3. The network component of claim 1, wherein:
the first network is a local area network (LAN); and
the second network is a LAN.

4. The network component of claim 1, wherein the traffic and the return traffic are asymmetrically routed.

5. The network component of claim 1, wherein assigning the flow ownership to the first node comprises creating a flow owner entry in a flow entry table to identify the first node as a flow owner.

6. The network component of claim 1, wherein assigning the flow ownership to the second node comprises updating a flow owner entry in a flow entry table to identify the second node as a flow owner.

7. The network component of claim 1, wherein detecting the diversion of the return traffic is in response to receiving the return traffic from the second node.

8. A method, comprising:
receiving traffic from a first network;
assigning flow ownership of the traffic to a first node;
communicating the traffic to a second network;
receiving return traffic from a second node;
detecting a diversion of the return traffic;
relinquishing the flow ownership; and
assigning the flow ownership to the second node.

9. The method of claim 8, wherein a node cluster comprises the first node and the second node.

10. The method of claim 8, wherein:
the first network is a local area network (LAN); and
the second network is a LAN.

11. The method of claim 8, wherein the traffic and the return traffic are asymmetrically routed.

12. The method of claim 8, wherein assigning the flow ownership to the first node comprises creating a flow owner entry in a flow entry table to identify the first node as a flow owner.

13. The method of claim 8, wherein assigning the flow ownership to the second node comprises updating a flow owner entry in a flow entry table to identify the second node as a flow owner.

14. The method of claim 8, wherein detecting the diversion of the return traffic is in response to receiving the return traffic from the second node.

15. One or more computer-readable non-transitory storage media embodying instructions that, when executed by a processor, cause the processor to perform operations comprising:
receiving traffic from a first network;
assigning flow ownership of the traffic to a first node;
communicating the traffic to a second network;
receiving return traffic from a second node;
detecting a diversion of the return traffic;
relinquishing the flow ownership; and
assigning the flow ownership to the second node.

16. The one or more computer-readable non-transitory storage media of claim 15, wherein a node cluster comprises the first node and the second node.

17. The one or more computer-readable non-transitory storage media of claim 15, wherein:
the first network is a local area network (LAN); and
the second network is a LAN.

18. The one or more computer-readable non-transitory storage media of claim 15, wherein the traffic and the return traffic are asymmetrically routed.

19. The one or more computer-readable non-transitory storage media of claim 15, wherein assigning the flow ownership to the first node comprises creating a flow owner entry in a flow entry table to identify the first node as a flow owner.

20. The one or more computer-readable non-transitory storage media of claim 15, wherein assigning the flow ownership to the second node comprises updating a flow owner entry in a flow entry table to identify the second node as a flow owner.

* * * * *